(12) United States Patent
Hamilton

(10) Patent No.: US 7,246,269 B1
(45) Date of Patent: Jul. 17, 2007

(54) EFFICIENT MEMORY CHECK ARCHITECTURE AND METHOD

(75) Inventor: Thomas H. Hamilton, Manor, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 499 days.

(21) Appl. No.: 10/839,072

(22) Filed: May 5, 2004

(51) Int. Cl.
*G06F 11/00* (2006.01)
(52) U.S. Cl. .................................................. 714/42
(58) Field of Classification Search ................... 714/42
See application file for complete search history.

(56) References Cited

U.S. PATENT DOCUMENTS

| | | |
|---|---|---|
| 5,673,388 A | 9/1997 | Murthi et al. |
| 6,158,000 A | 12/2000 | Collins |
| 6,434,696 B1 | 8/2002 | Kang |
| 7,058,782 B2 * | 6/2006 | Henderson et al. ......... 711/170 |
| 2001/0047497 A1 * | 11/2001 | Larson et al. .................. 714/42 |
| 2004/0230767 A1 * | 11/2004 | Bland et al. ................. 711/203 |

OTHER PUBLICATIONS

"BIOS and Kernel Developer's Guide for AMD Athlon™ 64 and AMD Opteron™ Processors," AMD Data Sheet, Publication #26094, Revision 3.06; Sec. 3.6 "Function 3—Miscellaneous Control," 3 pp.; Chapter 5, "Machine Check Architecture," pp. 143-166.

* cited by examiner

*Primary Examiner*—Michael Maskulinski
(74) *Attorney, Agent, or Firm*—Larson Newman Abel Polansky & White, LLP

(57) ABSTRACT

Methods and apparatus are provided for use in testing a memory (230) coupled to a processing node (214). A background scrubber (316) in the processing node (214) is initialized to perform a test of the memory (230). A status of the background scrubber (316) is checked in which the status indicates whether an error occurred during the test. A predetermined action is taken in response to the status indicating that the error occurred during the test.

31 Claims, 6 Drawing Sheets

EFFICIENT MEMORY CHECK ARCHITECTURE AND METHOD

CROSS-REFERENCE TO RELATED APPLICATION(S)

Related subject matter is found in a copending U.S. patent application, application Ser. No. 10/763,009, filed Jan. 21, 2004, entitled "MEMORY CHECK ARCHITECTURE AND METHOD FOR A MULTIPROCESSOR COMPUTER SYSTEM", invented by Oswin Housty and assigned to the Assignee hereof.

TECHNICAL FIELD

The present invention generally relates to data processing systems, and more particularly relates to data processing systems that perform memory testing such as after system startup.

BACKGROUND

A computer system is generally defined in terms of three basic system elements: a central processing unit (CPU), memory, and input/output (I/O) peripheral devices. A typical computer system works with a computer program known as an operating system (OS). The OS is a program that manages all other programs in a computer, the user interface, the interface with peripheral devices, memory allocation, and so forth. Each OS is written for a variety of system configurations such as variable physical memory size, various numbers of peripherals connected to the system, etc. and thus it can remain ignorant of the actual system configuration.

On the other hand the basic input/output system (BIOS) is a computer program that uses the actual system configuration to manage data flow between the OS and attached memory and I/O peripherals. The BIOS can translate OS requests into concrete actions that the CPU can take in response. The BIOS is usually stored on a nonvolatile memory device such as a read-only memory (ROM) and may be programmed for the particular system configuration.

The BIOS also manages operation of the computer system after startup and before control is passed to the OS. The BIOS typically performs a memory check after power-on to determine whether the memory physically present in the system is operational and can be used by the OS, and takes corrective action if it finds any bad memory blocks. After completing the memory check and other startup tasks the BIOS passes control to the OS but thereafter is periodically called by the OS to perform system specific I/O functions.

Early personal computers (PCs) based on the IBM architecture and the DOS operating system showed the progress of the memory check on the screen. For early PCs with their relatively small amounts of memory (by today's standards) the memory check was a minor annoyance, and DOS displayed the progress of the memory check on the computer screen. As time went on, microprocessors and computer memories became faster. At the same time integrated circuit memories became cheap and new memory-intensive software programs were developed. Thus the length of the memory check at startup has remained a problem.

Furthermore certain computer applications such as servers are memory intensive. Thus the amount of time required for the memory check would delay normal system operation so long as to be a nuisance to users. One solution to this problem is to merely sample test a certain portion of the memory at startup. While this allows some memory testing to take place at startup before control is passed to the operating system, the amount of memory coverage at startup using such a scheme is low.

Thus it would be desirable to increase the amount of memory that can be tested at system startup without causing an annoyingly long delay, or alternatively to shorten the time required by the memory check to allow more memory to be tested in a given period of time. These and other desirable features and characteristics of the present invention will become apparent from the subsequent detailed description and the appended claims, taken in conjunction with the accompanying drawings and the foregoing technical field and background.

BRIEF SUMMARY

A method is provided for use in testing a memory coupled to a processing node. A background scrubber in the processing node is initialized to perform a test of the memory. A status of the background scrubber is checked in which the status indicates whether an error occurred during the test. A predetermined action is taken in response to the status indicating that the error occurred during the test.

In another form a method is provided for use in a multiprocessing system having a plurality of processing nodes each including a memory. A background scrubber in each of the plurality of processing nodes is initialized to perform a test of the memory. A status of the background scrubber in each of the plurality of processing nodes is checked, in which the status indicates whether an error occurred during the test of the memory. A predetermined corrective action is taken in each of the plurality of processing nodes in which the status indicates that at least one error occurred during the test of the memory.

In another form a method is provided of testing a memory coupled to a processing node. A test of a plurality of locations in the memory is performed. Whether an error occurred during the test is determined. A predetermined corrective action is taken in response to at least one non-correctable error. A different action is taken in response to at least one correctable error.

In yet another form a basic input/output system (BIOS) memory adapted to be coupled to a boot strap processor (BSP) includes first, second, third, and fourth sets of instructions. The first set of instructions is executable by the BSP to initialize a background scrubber in a processor node to test a predetermined portion of a memory. The second set of instructions is executable by the BSP to determine when the background scrubber has tested the predetermined portion of the memory. The third set of instructions is executable by the BSP to determine whether any errors occurred when the background scrubber tested the predetermined portion of the memory. The fourth set of instructions is executable by the BSP to take a predetermined corrective action in response to the third set of instructions determining that at least one error occurred.

In still another form a method of testing a memory is provided for a computer system having the memory. A plurality of memory locations of the memory are tested. Whether an error occurred during testing is determined. If the error occurred, whether the error is correctable or non-correctable is determined. The memory is reconfigured to exclude a memory location if the error is non-correctable. A predetermined action is taken if the error is correctable.

SUMMARY

A method is provided for use in testing a memory coupled to a processing node. A background scrubber in the processing node is initialized to perform a test of the memory. A status of the background scrubber is checked in which the status indicates whether an error occurred during the test. A predetermined action is taken in response to the status indicating that the error occurred during the test.

In another form a method is provided for use in a multiprocessing system having a plurality of processing nodes each including a memory. A background scrubber in each of the plurality of processing nodes is initialized to perform a test of the memory. A status of the background scrubber in each of the plurality of processing nodes is checked, in which the status indicates whether an error occurred during the test of the memory. A predetermined corrective action is taken in each of the plurality of processing nodes in which the status indicates that at least one error occurred during the test of the memory.

In another form a method is provided of testing a memory coupled to a processing node. A test of a plurality of locations in the memory is performed. Whether an error occurred during the test is determined. A predetermined corrective action is taken in response to at least one non-correctable error. A different action is taken in response to at least one correctable error.

In yet another form a basic input/output system (BIOS) memory adapted to be coupled to a boot strap processor (BSP) includes first, second, third, and fourth sets of instructions. The first set of instructions is executable by the BSP to initialize a background scrubber in a processor node to test a predetermined portion of a memory. The second set of instructions is executable by the BSP to determine when the background scrubber has tested the predetermined portion of the memory. The third set of instructions is executable by the BSP to determine whether any errors occurred when the background scrubber tested the predetermined portion of the memory. The fourth set of instructions is executable by the BSP to take a predetermined corrective action in response to the third set of instructions determining that at least one error occurred.

In still another form a method of testing a memory is provided for a computer system having the memory. A plurality of memory locations of the memory are tested. Whether an error occurred during testing is determined. If the error occurred, whether the error is correctable or non-correctable is determined. The memory is reconfigured to exclude a memory location if the error is non-correctable. A predetermined action is taken if the error is correctable.

BRIEF DESCRIPTION OF THE DRAWINGS

The present invention will hereinafter be described in conjunction with the following drawing figures, wherein like numerals denote like elements.

FIG. 6 is a timing diagram illustrating the operation of the BIOS service processor of FIG. 2 after power on.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
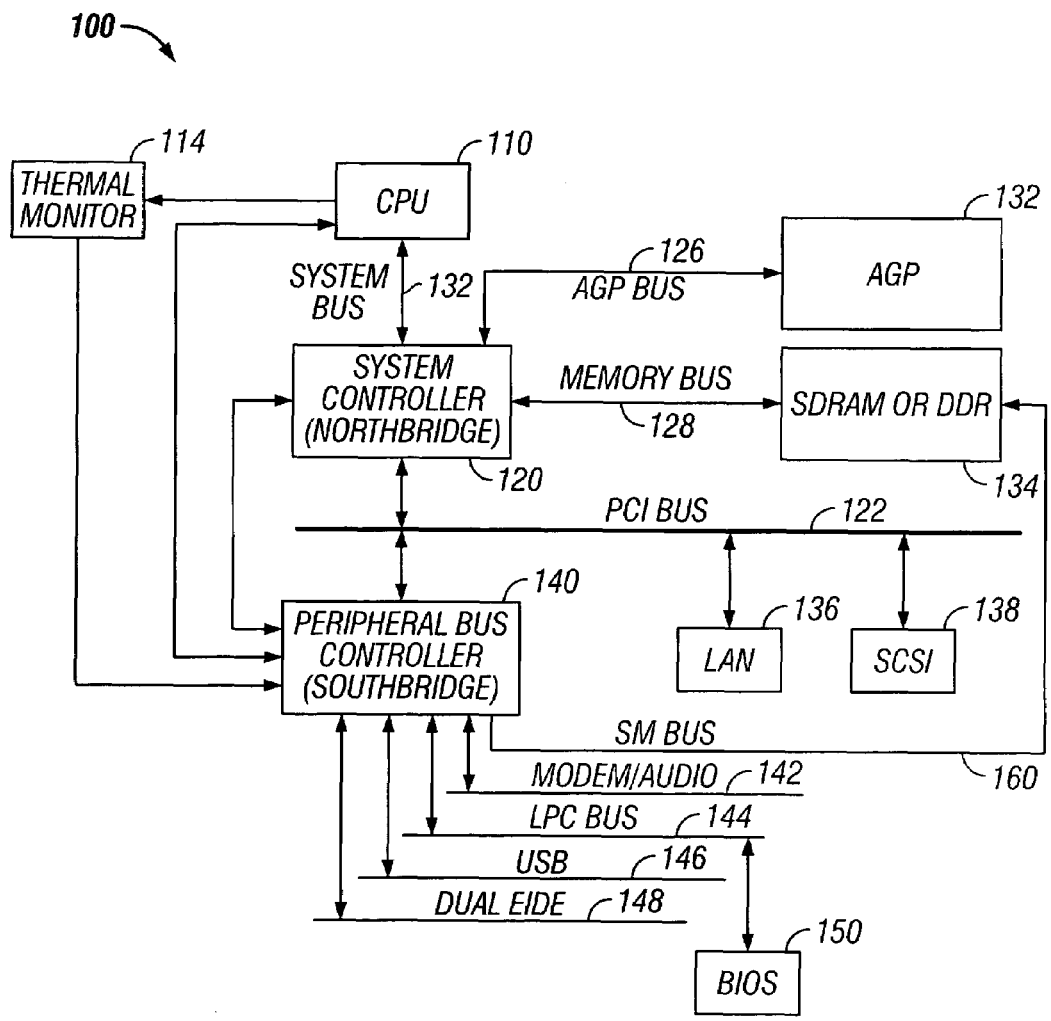
FIG. 1 illustrates a block diagram of a personal computer (PC) system known in the prior art.

FIG. 1 illustrates a block diagram of a computer system 100 known in the prior art. Generally computer system 100 is a conventional personal computer (PC) system having an architecture adapted from the PC architecture first designed by the International Business Machines Corporation. Computer system 100 includes a high-performance central processing unit (CPU) 110 that executes instructions of the so-called x86 instruction set such as the microprocessor sold under the Athlon trademark available from Advanced Micro Devices of Sunnyvale, Calif. The x86 instruction set is based on the instruction set of the 8086 microprocessor first manufactured by Intel Corporation of Santa Clara, Calif. CPU 110 generally interfaces to external devices over a system bus 132 by which it is coupled to a system controller 120, conventionally referred to as a "Northbridge". Northbridge 120 offloads CPU 110 of the task of communicating with high performance system resources which may have different bus structures. One of these devices is main memory 134 in the form of synchronous dynamic random access memory (SDRAM) or double data rate (DDR) SDRAM over a dedicated memory bus 128. Another one of these devices is an advanced graphics processor (AGP) 132 over an AGP bus 126.

Northbridge 120 is also connected to a lower performance peripheral component interconnect (PCI) bus 122 to which several other devices, including a local area network (LAN) controller 136 and a small computer system interface (SCSI) controller 138, are connected. Also connected to PCI bus 122 is a peripheral bus controller 140, conventionally referred to as a "Southbridge", for coupling to even lower performance devices. Southbridge 122 has various dedicated buses including a modem/audio bus 142, a Low Pin Count (LPC) bus 144, a universal serial bus (USB) 146, and a dual Enhanced Integrated Drive Electronics (EIDE) bus 148. One of the devices coupled to LPC bus 144 is a basic input/output system (BIOS) read only memory (ROM) chip 150. Southbridge 140 is connected to a thermal monitor 114 which is connected to CPU 110 and allows Southbridge 140 to perform power management functions if CPU 110 exceeds a certain temperature during operation. Southbridge 140 has a bidirectional connection to CPU 110 by which CPU 110 programs it for operation.

In addition, Southbridge 140 has a bus known as a system management (SM) bus labeled "SM BUS" 160 by which it is connected to memory 134. SM BUS 160 is the mechanism by which CPU 110, under the control of the BIOS program stored in BIOS ROM 150, is able to perform memory tests on memory 134 at startup. This conventional memory test may be performed as follows. After CPU 110 comes up out of reset, it fetches a reset vector pointing to a location in BIOS ROM 150 containing the startup program sequence. One of the items performed in the startup program sequence is to determine the configuration of memory 134. The BIOS directs Southbridge 140 to poll memory 134 over SM bus 160 to determine how much memory is installed. After determining the memory configuration, the BIOS performs a memory check through Northbridge 120. For example, the BIOS may cause CPU 110 to write a predefined test pattern (e.g., $55) to all memory locations, and subsequently read the memory locations to determine whether the test pattern was correctly stored. Later an opposite test pattern may be applied (e.g., $AA) to all memory locations and read back to determine whether each memory cell may assume either logic state. Any bad memory element is noted and used to configure Northbridge 120, and in this way, bad memory may be mapped out of the system.

While this type of test can be efficiently performed on PCs which have a relatively small amount of memory, it becomes more difficult as the size of memory becomes larger. Furthermore new computers based on multiprocessor architectures may have their memory distributed among many system nodes, but configure the system using a BIOS program connected to a single node. In such a system this simple local memory test and reconfiguration will no longer suffice.

Figure 2:
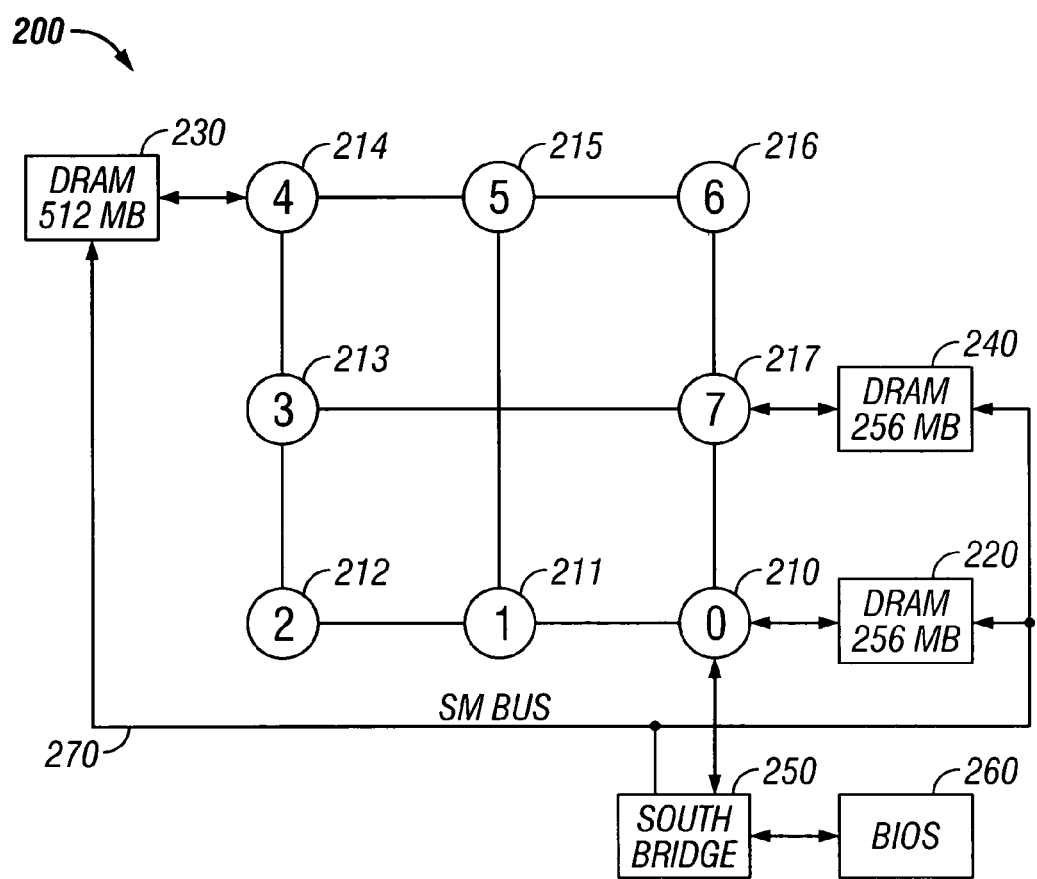
FIG. 2 illustrates a block diagram of a multiprocessor computer system according to the present invention.

An alternate way of performing a memory test in a multiprocessor computer system can be better understood with reference to FIG. 2, which illustrates a block diagram of a multiprocessor computer system 200 according to the present invention. Computer system 200 includes generally eight processor nodes 210–217 connected in an array or fabric in which each node is connected to one or more adjacent nodes. For example, system 200 is an eight-processor system in which node 210 labeled "0" is connected to adjacent nodes 1 and 7; node 211 labeled "1" is connected to adjacent nodes 0, 2, and 5; and so on. Each node used in system 200 has three available link controllers which are connected to either adjacent processor nodes or to I/O devices. Since nodes 0, 2, 4 and 6 use only two of their available three link controllers to connect to adjacent processor nodes, they have an additional link controller available for connection to I/O devices.

Each node in system 200 also has the capability to connect to local memory that will be directly accessible to it and indirectly accessible to all other processor nodes. In system 200, for example, node 210 is connected to a 256 megabyte (MB) DRAM 220, node 214 is connected to a 512 MB DRAM memory 230, and node 217 is connected to a 256 MB DRAM memory 240. However many other memory configurations are possible using various array configurations and memory may in fact be present on all of the nodes.

While the physical memory in system 200 is distributed among the nodes, all the memory is visible to every node. Thus the array is configured by programming respective nodes with configuration information. This configuration information can be used to form a system address map, which is a table of all memory and memory-mapped I/O devices in the system, and a node address map. If the processor in node 210 initiates an access to a particular physical address, the memory controller in node 210 will determine whether the physical address corresponds to a location in local memory 220 or in remote memory. If the physical address is in local memory, the memory controller in node 210 performs the access to DRAM 220. If the physical address is in remote memory, the memory controller in node 210 determines the node number corresponding to the physical address and issues a request packet addressed to that node. The request packet eventually reaches the memory controller in the accessed node after it "hops" between the nodes over the array using the appropriate link controllers.

In order to determine the memory configuration in this multiprocessor system, one of the nodes is selected to be the boot strap processor (BSP). In system 200, node 210 is the BSP (referred to hereinafter as BSP 210), and it includes a link controller connected to an I/O device in the form of a Southbridge 250, which in turn is connected to a BIOS ROM 260. Note that as used herein "BIOS" refers to either the software stored in BIOS ROM 260 or the device storing the software, as the context dictates. Note that the BIOS can be stored in any of a variety of known storage media, including a ROM, an erasable programmable ROM (EPROM), and electrically erasable programmable ROM (EEPROM), a flash EEPROM, and the like.

The selection of the node to be the BSP occurs as follows. On power up, the processor in each node contains startup microcode that sends packets on all three of its link controllers to determine what kind of device the respective link controller is connected to. For example, the first link controller on node 210 detects that it is connected to a processor (node 211), the second link controller detects that it is connected to a processor (node 217), and the third link controller detects that it is connected to a Southbridge (Southbridge 250). In response to detecting that its third link controller is connected to a Southbridge, node 210 becomes the BSP and accesses BIOS 260 to begin the startup sequence for the system.

Southbridge 250 is connected to all the memory devices in system 200 over an SM BUS 270. Thus at startup the BIOS executing on BSP 210 uses SM BUS 270 to determine the amount and node location of memory devices in the system and to communicate the initial configuration to the processor array. The BIOS communicates this information to the processor array by programming the memory controllers and DRAM controllers in respective nodes with the configuration information. After the initial configuration has been determined, the BIOS performs a memory check, determines where any bad memory elements are located, and subsequently maps them out.

Figure 3:
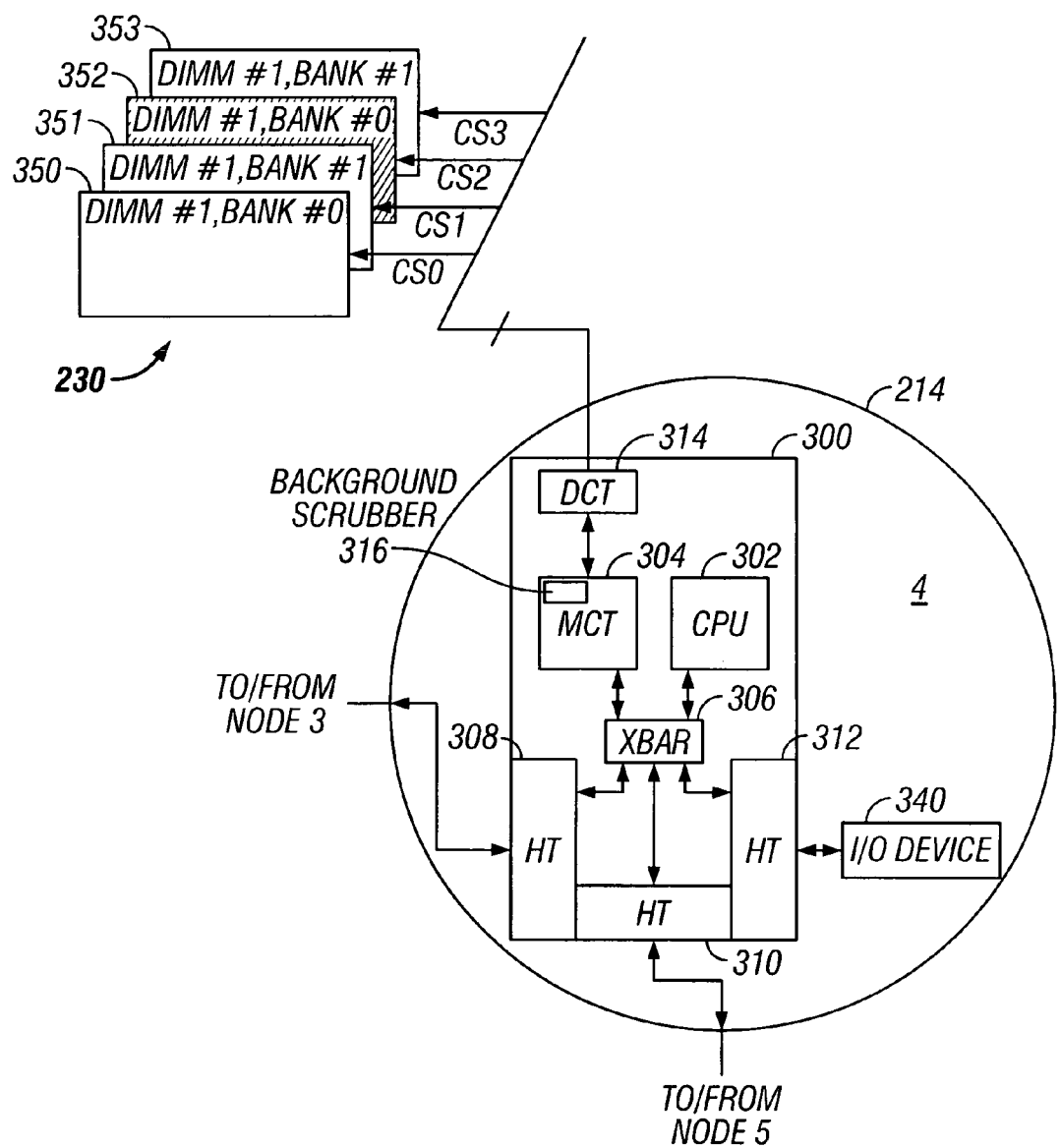
FIG. 3 illustrates in block diagram form a portion of the computer system of FIG. 2 having a bad memory element.

To explain how BSP 210 configures and tests the memory, reference is now made to FIG. 3, which illustrates in block diagram form a portion of computer system 200 of FIG. 2 having a bad memory element. This portion includes node 214 and its associated local memory 230 both shown in greater detail. Node 214 includes a data processor in the form of a single-chip microprocessor 300 and an input/output (I/O) device 340. Microprocessor 300 includes generally a central processing unit (CPU) 302, a memory controller labeled "MCT" 304, a crossbar switch labeled "XBAR" 306, three link controllers 308, 310, and 312 each labeled "HT" for HyperTransport, described more fully below, and a DRAM controller (DCT) 314.

CPU 302 is a processor adapted to execute instructions of the x86 instruction set. CPU 302 however includes many sophisticated functions for high-performance execution of x86 programs including pipelining and superscalar design.

Memory controller 304 is the mechanism for data transfer between CPU 302 and both its local memory and remote memory distributed throughout the rest of the system. Memory controller 304 offloads the task of initiating and terminating memory accesses from CPU 302 and thus functions as an integrated Northbridge. It includes internal queues to allow efficient use of the external bus to the local memory. It also includes memory maps to determine whether an address of a memory access is intended for local memory or for remote memory, in which case it initiates a request packet to another node connected to node 214 via HT link controller 308 or 310.

Memory controller 304 includes a background scrubber 316. Background scrubber 316 operates with a machine check architecture (MCA) block (not shown in FIG. 3) to provide a hardware mechanism to detect and report a variety of hardware (or machine) errors when reading and writing data, probing the caches, and during cache line fill and writeback operations. Software can enable microprocessor 300 to report machine check errors through the so-called machine check exception. The error conditions are logged in a set of model-specific registers (MSRs) that can be used by system software to determine the possible source of a hardware problem.

In particular background scrubber 316 is associated with memory 230 and is a hardware circuit that operates in the background, independent of CPU 302. In a background mode, it periodically wakes up during idle periods to read portions of memory 230 to look for errors using an error correcting code (ECC) mechanism built in to the Northbridge portion of microprocessor 300. The ECC mechanism allows certain memory errors to be detected and corrected, and other more serious memory errors to be detected. The ECC mechanism calculates and stores a Reed-Solomon code that describes the bit sequence of a unit of data. For example a 64-bit word requires seven extra bits to store this code and the MCA uses an eight-bit byte to store the ECC. Then when the data is next read, the stored ECC is compared to the calculated ECC. This mechanism allows single-bit errors ("correctable errors") to be detected and corrected, and multiple bit errors ("non-correctable errors") to be detected but not corrected. If background scrubber 316 finds a single-bit ECC error, it is able to correct the error and rewrite the correct data back to memory 230. Thus it corrects the error before the memory line is read during normal operation, and thus saves the additional time it would take to fix single-bit ECC errors when they are encountered during normal operation.

Background scrubber 316 also has a mode known as redirect mode. In redirect mode, background scrubber 316 detects ECC errors while a requesting device, such as CPU 302, accesses memory 230 during normal operation. Background scrubber 316 corrects correctable ECC errors as data is passed to the requesting device. Redirect mode and background scrubbing may both be active at the same time. Thus correctable errors "redirect" background scrubber 316 from the next address to be scrubbed in background mode to the memory location accessed by the requesting device that caused the error. Background scrubber 316 then rewrites the correct data back to memory 230 and resumes background operation, proceeding to the next address to be scrubbed after the end of the programmed interval. As will be described further below, the BIOS advantageously uses these features of background scrubber 316 to help it perform the memory check more efficiently.

XBAR 306 is a switching/multiplexing circuit designed to couple together the buses internal to microprocessor 300.

HT link controllers 308, 310, and 312 are coupled to devices external to microprocessor 300 over corresponding input and output channels. Each of HT link controllers 308, 310, and 312 substantially complies with the physical interface specified in the HyperTransport™ I/O Link Specification, Revision 1.03, © 2001 HyperTransport Technology Consortium. In node 214 HT link controllers 308 and 310 function as coherent links that communicate with nodes 213 and 215 of FIG. 2, respectively, using a special coherent form of HyperTransport. HT link controller 312 functions as a host bridge that communicates with I/O device 340 using the non-coherent form of HyperTransport. Details of the HyperTransport protocol are not relevant to understanding the present invention and will not be discussed further.

I/O device 340 is an input/output device that, for example, implements the local area network communication protocol standardized by the Institute of Electrical and Electronics Engineers (IEEE) under the auspices of the IEEE 802.3 committee, commonly referred to as "Ethernet". However other types of I/O functions are possible as well.

Local memory 230 includes four dual in-line memory modules (DIMMs) 350–353. DIMMs 350–353 are banks of dynamic random access memories (DRAMs) and interface to microprocessor 300 using a conventional bus interface. For example, the DRAMs in DIMMs 350–353 comply with the JEDEC Double Data Rate (DDR) SDRAM Specification, Standard JESD79, Release 2, May 2002. In order to efficiently interface to multiple banks of memory using DDR timing specifications, microprocessor 300 includes DRAM controller 314 to operate the interface between memory controller 304 and DIMMs 350–353. In addition to generating standard synchronous address, data, and control signals as specified in JESD79, DRAM controller 314 also includes memory region programming and comparison logic to generate unique chip select signals to activate selected ones of DIMMs 350–353. As shown in FIG. 3, DRAM controller 314 outputs chip select signals labeled "CS0", "CS1", "CS2", and "CS3" to DIMMs 350–353, respectively. Note that these chip select signals are designated logically but the physical chip select signals are conventionally active low signals.

The operation of system 200 in the presence of a bad memory element will now be described by assuming DIMM 352 is bad, i.e., one or more storage locations in DIMM 352 are or become defective causing at least one memory element in DIMM 352 to fail the BIOS memory test. System 200 provides a way for the BIOS to detect the DIMM with the bad memory element using background scrubber 316, take a corrective action such as mapping it out of the system, and continue operating, as will be described further below.

Figure 4:
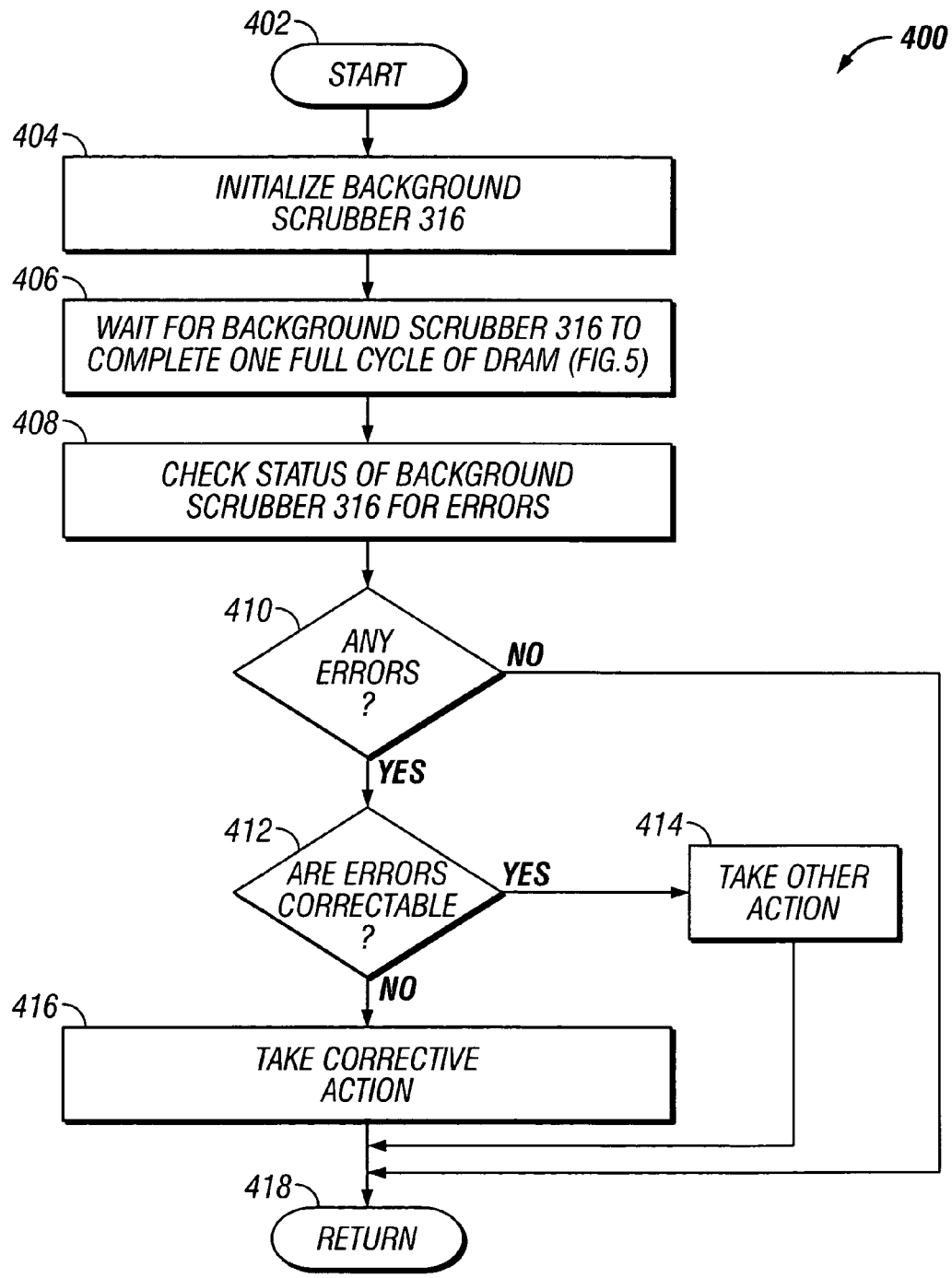
FIG. 4 illustrates a flow chart of a memory check algorithm according to the present invention.

FIG. 4 illustrates a flow chart of a memory check routine 400 according to the present invention. Routine 400 may take various forms such as a subroutine called by the BIOS or a portion of the main BIOS routine. In general each step corresponds to one or more software instructions executable by the CPU in BSP 210. Routine 400 may be coded by any of a variety of known programming techniques such as C++ language programming, assembly language programming, direct machine language coding, etc.

The algorithm begins at step 402 at which time BIOS 260 calls or begins processing routine 400. At step 404 routine 400 initializes background scrubber 316. Around this time the BIOS also initializes the overall machine check architecture (MCA) system. Routine 400 initializes background scrubber 316 by programming a starting address (the base address of memory 230), a limit address (the highest address in memory 230), and an interval value (the shortest interval between tests of successive memory locations), and starting background scrubber 316. Thus step 404 performs any initialization tasks required to allow background scrubber 316 to test memory 230 independently of BIOS 260 and CPU 302. BIOS 260 is free to perform other initialization tasks while background scrubber 316 proceeds with the memory test.

Figure 5:
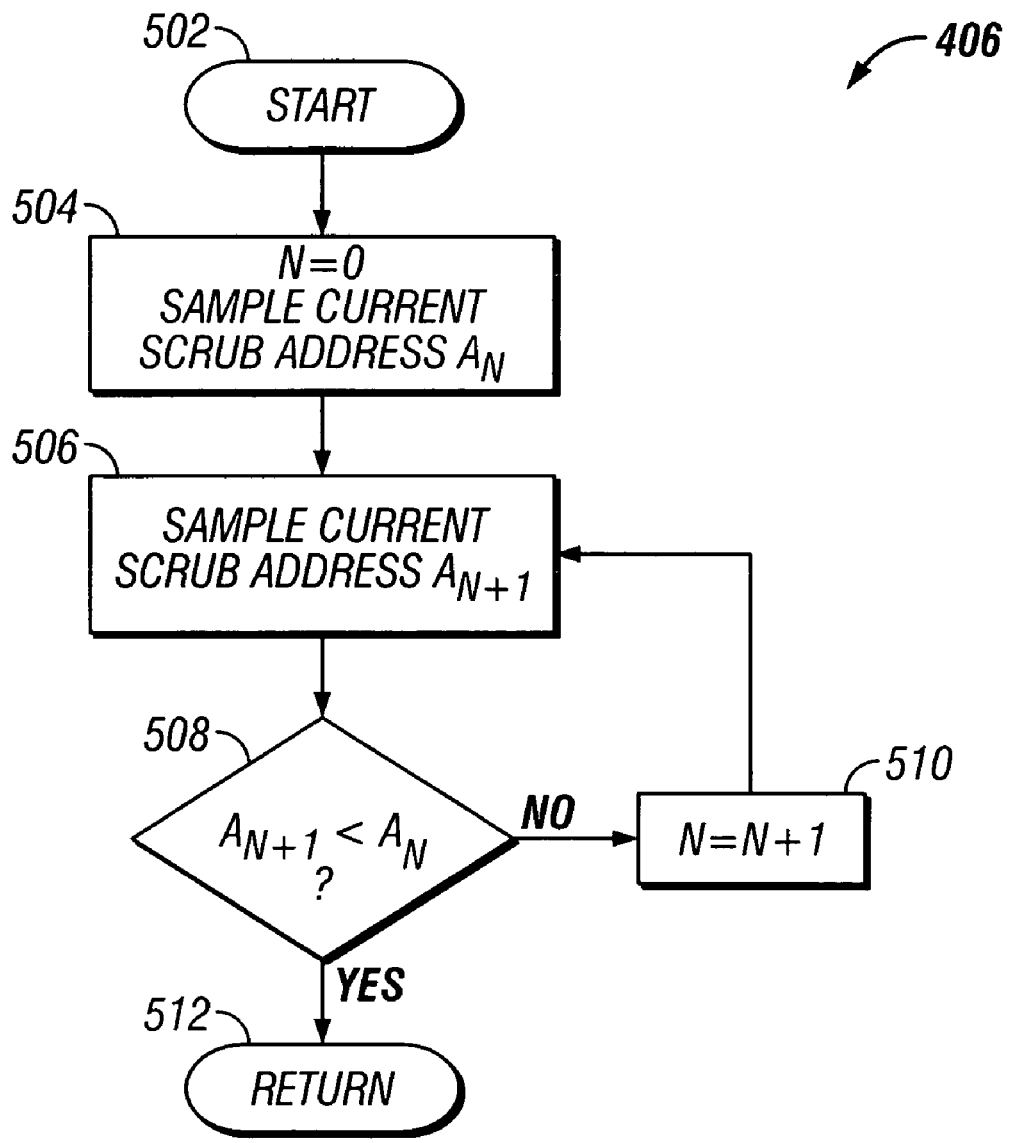
FIG. 5 illustrates a flow chart of the waiting step of FIG. 4.

Next at step 406, routine 400 waits until background scrubber 316 has completed one full testing cycle of memory 230. This full testing cycle may not include testing all locations if background scrubber 316 has been programmed to sample test memory 230. Advantageously during step 406 BIOS 260 is able to perform other power on self test activities that do not interfere with background scrubber 316 (such as operations that use the bus between DRAM controller 314 and memory 230). A method by which routine 400 efficiently determines whether background scrubber 316 has completed one full cycle of memory 230 is better understood with respect to FIG. 5, which illustrates a flow chart of step 406 of FIG. 4. After starting at step 502, an index parameter N is first set to zero, and a parameter known as the current scrub address and designated "AN" is read by BSP 210. Scrubber 316 maintains a copy of the current scrub address in an internal memory-mapped register. Next at step 506 the next current scrub address designated "AN+1" is read. Step 508 determines whether the next current scrub address AN+1 is less than the previous current scrub address AN (AN+1<AN). This condition indicates that background scrubber 316 has incremented the current address pointer past the limit of memory 230 and wrapped around to the beginning. If not, at step 510 the index N is incremented and flow returns to step 506. If AN+1<AN, routine 500 determines that all memory locations have been tested and returns to routine 400. This method has the advantage that it provides a simple way of determining when background scrubber 316 has incremented the addresses past the end of the memory space occupied by memory 230. Note that this method does not require that background scrubber 316 test all locations, only that after initialization background scrubber 316 tests memory locations in ascending order and wraps its address after it has reached the limit address.

In an alternative implementation having the same advantage of routine 406, background scrubber 316 could successively decrement (instead of increment) the scrub address during operation. In this case background scrubber 316 would be initialized at step 404 by setting the starting address to the highest address and the limit address to the lowest address. Then step 406 could be realized by altering step 508 to determine whether AN+1>AN.

Returning now to FIG. 4, once BIOS 260 has determined that memory 230 has been fully tested, it checks the status of background scrubber 316 for errors at step 408. BIOS 260 performs step 408 by reading a status register in background scrubber 316. Decision box 410 then changes the flow based on whether any errors occurred. If the status register indicates that no errors occurred, then the memory test is complete and the flow returns to the remaining POST functions at step 418. If the status register indicates that at least one error occurred, then BIOS 260 next determines whether the error was a correctable error at step 412.

A correctable error status may indicate that the error was marginal and memory 352 is still usable, or that it was caused by a random electrical impulse that doesn't require correction. On the other hand an uncorrectable error is much more serious and usually indicates that a portion of memory 230, such as DIMM 352, is defective. BIOS 260 takes different actions depending upon the type error. If the error is uncorrectable, BIOS 260 takes a corrective action at step 416 since operating with defective memory will result in incorrect functioning of programs. In system 200 this corrective action takes the form of mapping the bad memory element out of the system and reporting the error to the user. Another example would be to alert the user to the error and shut down the computer. If the error is correctable, BIOS 260 takes another, different action at step 414. This other action may be doing nothing, reporting the error to the user but continuing to operate using the memory element that caused the error, retesting the memory and only mapping the memory element out on a subsequent failure, etc. BIOS 260 discriminates among the types of errors and takes different actions appropriate to the type of error.

The memory check architecture described above can be used to check significantly larger amounts of memory in a given amount of time through the use of background scrubber 316 available on processing node 214, or conversely allows the power on self test to complete in a much shorter amount of time and thus be less annoying to the user.

This advantage of the memory check architecture is multiplied in multiprocessor systems in which memory is resident on multiple nodes but only one of the processing nodes is selected to be the BSP. For example with respect to system 200 of FIG. 2, node 210 is selected to be the BSP. Node 210 advantageously initializes background scrubbers in each of processor nodes 210, 214, and 217 during the memory test. Thus background scrubber hardware on all three processor nodes acts in parallel to efficiently test memories 220, 230, and 240. If the memory is evenly distributed on M nodes, then the memory check architecture can reduce memory test time by a factor of about 1/M.

Figure 6:
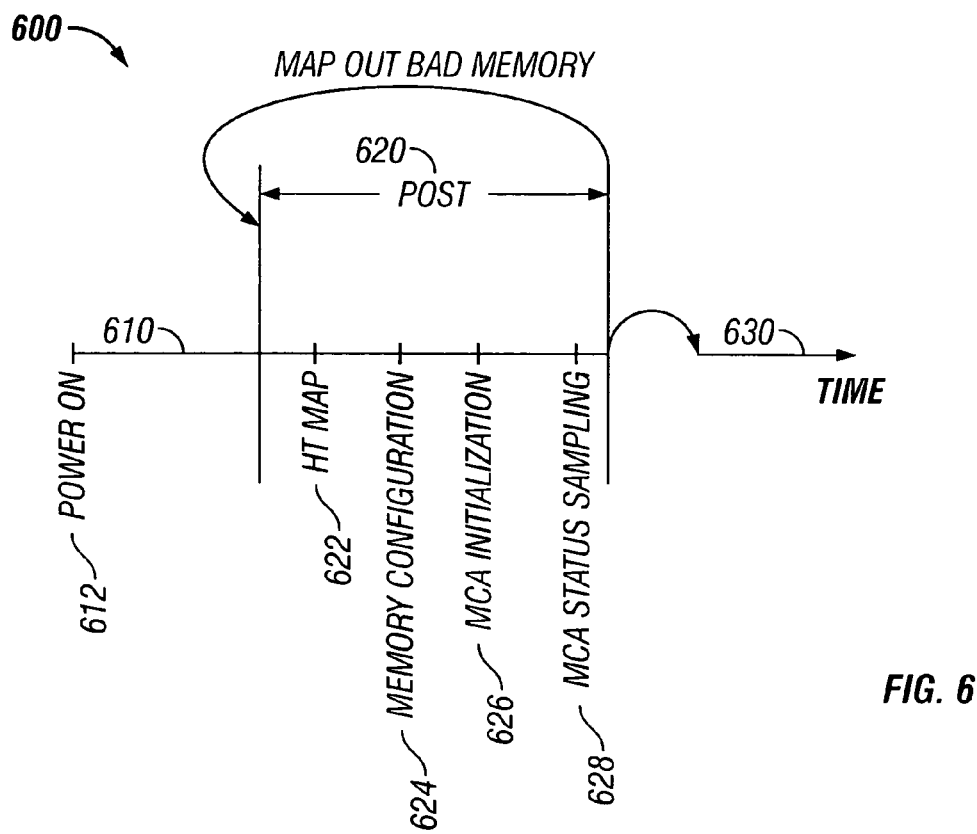

FIG. 6 is a timing diagram 600 illustrating the overall operation of the BIOS running on BSP 210 of FIG. 2 after power on. FIG. 6 depicts time in the horizontal direction as flowing from left to right with various BIOS tasks depicted along the time axis. Note that the BIOS operations relevant to understanding the present invention are described but the BIOS actually performs many other startup tasks that are conventional and well understood in the art and that will not be described further. Each of the tasks illustrated in FIG. 6 is performed using appropriate sets of instructions, executable by BSP 210, coded by any of a variety of known programming techniques such as C++ language programming, assembly language programming, direct machine language coding, etc.

BSP 210 performs many initialization tasks after system startup, which can be divided generally into a system initialization portion 610 including a power on task 612 and a power-on self test (POST) 620. During POST 620, BSP 210 performs an HT map task 622 by detecting the presence and interconnection of the installed processor nodes. The HT map takes the form of a routing table that the BIOS provides to all nodes, and in this way the BIOS configures the HT fabric.

The BIOS subsequently performs a memory configuration task 624 by using SM bus 270 to detect the presence of memory and I/O devices and to construct a system address map, as described more fully below. At this point the system address map will contain bad memory elements, such as single bytes, words or whole areas of blocks, if any are present in system 200. Memory configuration task 624 also configures the base and limit addresses of chip selects used in the DRAM controller of each node, and programs the appropriate registers in each microprocessor. The CS region information is thus distributed among the nodes of the system.

The BIOS then performs an MCA initialization task 626 which initializes the MCA block by programming the registers of the MCA system. MCA initialization task 626 also initializes background scrubber 316, to allow background scrubber 316 to operate independently of BIOS intervention. Later BIOS 260 performs an MCA status sampling task 628 (corresponding to step 408 in FIG. 4) that allows it to determine whether any errors have occurred. As noted above, BIOS 260 may take different actions depending on the type of error (correctable or non-correctable). The BIOS performs additional tasks after MCA status sampling task 628, and if the memory test has passed or only reported correctable errors, it transfers control to an operating system (such as the operating systems sold under the trademarks DOS and Windows, the Linux operating system, and the like) that operates during portion 630.

If BSP 210 detects a bad physical address, such as an address for which one or more non-correctable errors occurred, it maps the bad address out of the system, and re-runs POST 620.

Figure 7:
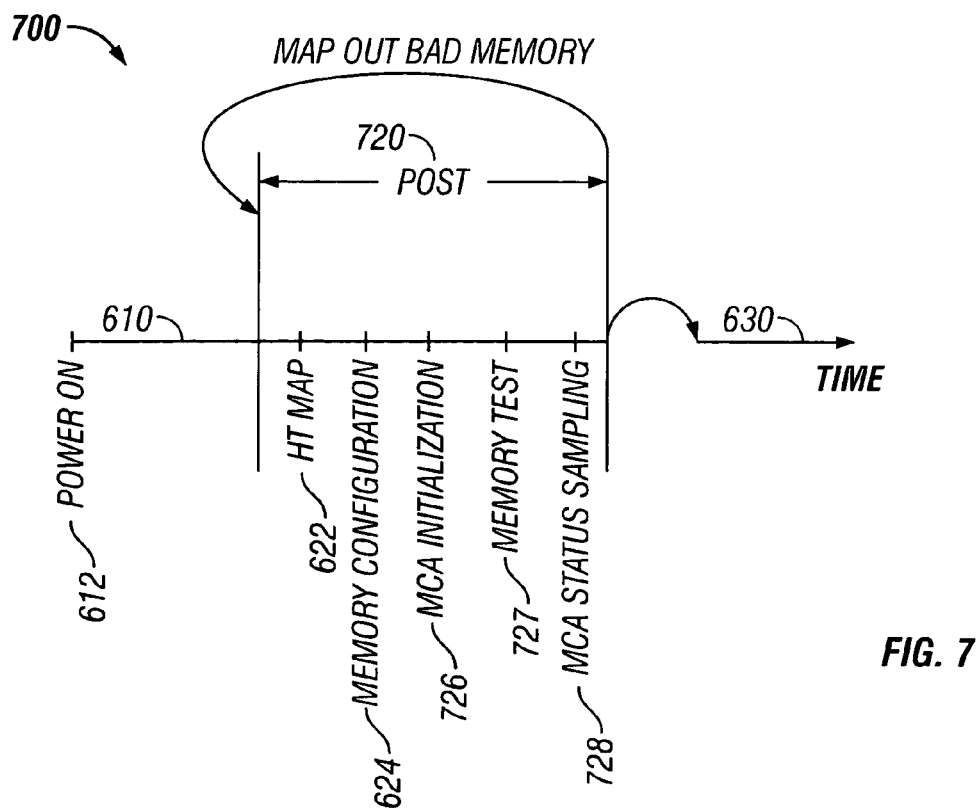
FIG. 7 is a timing diagram illustrating an alternative form of a memory check algorithm according to the present invention.

Another approach is shown in FIG. 7, which is a timing diagram 700 illustrating an alternative form of a memory check algorithm according to the present invention. This alternative memory check algorithm is similar to that illustrated in FIG. 6 except a different POST 720 replaces POST 620. POST 720 includes HT map task 622 and memory configuration task 624 as in FIG. 6. However POST 720 operates without a background scrubber, and MCA initialization task 726 only initializes other portions of the MCA that may be implemented, such as enabling the ECC mechanism. Then the BIOS programs CPU 302 or BSP 210 to perform the memory check directly in memory test 727. At the end of memory test 727 there is an MCA status sampling step 728 to check for correctable or non-correctable errors and take appropriate actions in response.

This alternative form of the memory check represents an "MCA assist" feature, in which the background scrubber is not used and the CPU or the BSP performs the memory test directly but uses the built-in ECC error detection feature. In this embodiment the CPU or BSP is able to discriminate between correctable errors and non-correctable errors and take different actions based on the type of error. It is also useful for microprocessors that do not implement the full background scrubber mechanism but still use ECCs.

Thus a computer system has been described that greatly improves the efficiency of the memory check task. In one form the BIOS is able to start a background scrubber in one or more processor nodes to perform a memory test in parallel with other startup activity. The improved efficiency is multiplied in multiprocessor systems in which memory is distributed among multiple processor nodes but the BIOS executes on a single processor node. The BIOS is also able to take advantage of a built-in ECC mechanism to discriminate between correctable errors and non-correctable errors, and to take different actions based on the type of error. This latter feature is applicable even in systems without a background scrubber in which the CPU or BSP actually performs the memory test. In all of these embodiments, the efficiency of the memory check is improved, resulting in better efficiency and less annoyance to the user at startup.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of testing a memory coupled to a processing node comprising the steps of:
    initializing, responsive to the processing node executing a basic input/output system (BIOS) program, a background scrubber in the processing node to perform a test of the memory;
    checking a status of said background scrubber in which said status indicates whether an error occurred during said test; and
    taking a predetermined action in response to said status indicating that said error occurred during said test.

2. The method of claim 1 wherein said step of initializing said background scrubber comprises the step of initializing said background scrubber in response to a system startup.

3. The method of claim 1 wherein said step of initializing said background scrubber comprises the step of:
    programming said background scrubber with an initial scrub address.

4. The method of claim 1 further comprising the step of:
    waiting for a predetermined time after said step of initializing and prior to said step of checking.

5. The method of claim 4 wherein said background scrubber tests successive ascending addresses in the memory and wherein said step of waiting comprises the steps of:
    reading a first current scrub address at a first point in time;
    reading a second current scrub address at a second point in time subsequent to said first point in time; and
    determining that said second current scrub address is lower than said first current scrub address.

6. The method of claim 4 wherein said background scrubber tests successive descending addresses in the memory and wherein said step of waiting comprises the steps of:
    reading a first current scrub address at a first point in time;
    reading a second current scrub address at a second point in time subsequent to said first point in time; and
    determining that said second current scrub address is higher than said first current scrub address.

7. The method of claim 1 further comprising the step of:
    determining an initial configuration of the memory.

8. The method of claim 1 wherein said step of taking said predetermined action comprises the step of:
    reconfiguring the memory in response to said status indicating that said error is a non-correctable error.

9. The method of claim 8 wherein said step of reconfiguring further comprises the step of:
    reconfiguring the memory to exclude a memory location in response to said status indicating said non-correctable error for said memory location.

10. The method of claim 1 wherein said step of taking said predetermined action comprises the step of:
    retesting the memory in response to said status indicating that said error is a correctable error.

11. In a multiprocessing system having a plurality of processing nodes each including a memory, a method comprising the steps of:
    initializing, responsive to one of the plurality of processor nodes executing a basic input/output system (BIOS) program, a background scrubber in each of the plurality of processing nodes to perform a test of the memory;
    checking a status of said background scrubber in each of the plurality of processing nodes in which said status indicates whether an error occurred during said test of the memory; and taking a predetermined corrective action in each of the plurality of processing nodes in which said status indicates that at least one error occurred during said test of the memory.

12. The method of claim 11 wherein said test takes place at substantially the same time in each of the plurality of processing nodes.

13. The method of claim 11 further comprising the steps of:
identifying a processing node that is to be a basic input/output system (BIOS) service processor; and
performing said steps of initializing, checking, and taking using said BIOS service processor.

14. The method of claim 13 wherein said step of performing further comprises the step of performing said steps of initializing, checking, and taking in response to said BIOS service processor executing a BIOS program stored in a memory coupled to said BIOS service processor.

15. A method of testing a memory coupled to a processing node comprising the steps of:
performing a test of a plurality of locations in the memory using a background scrubber, responsive to the processing node executing a basic input/output system (BIOS) program that initializes the background scrubber;
determining whether an error occurred during said test;
taking a predetermined corrective action in response to at least one non-correctable error; and
taking a different action in response to at least one correctable error.

16. The method of claim 15 wherein said step of taking said predetermined corrective action comprises the step of mapping out a bad memory location from the memory.

17. The method of claim 15 wherein said step of taking said different action comprises the step of not taking any corrective action.

18. The method of claim 15 wherein said step of taking said different action comprises the step of retesting the memory.

19. A basic input/output system (BIOS) memory adapted to be coupled to a boot strap processor (BSP) comprising:
a first set of instructions executable by said BSP to initialize a background scrubber in a processor node to test a predetermined portion of a memory;
a second set of instructions executable by said BSP to determine when said background scrubber has tested said predetermined portion of said memory;
a third set of instructions executable by said BSP to determine whether any errors occurred when said background scrubber tested said predetermined portion of said memory; and
a fourth set of instructions executable by said BSP to take a predetermined corrective action in response to said third set of instructions determining that at least one error occurred.

20. The BIOS memory of claim 19 further comprising a fifth set of instructions executable by said BSP to determine a configuration of said memory.

21. The BIOS memory of claim 19 further comprising a sixth set of instructions executable by said BSP to determine which one of a plurality of processing nodes said memory is coupled to.

22. The BIOS memory of claim 19 wherein said first set of instructions initializes said background scrubber by setting a starting address to a lowest address.

23. The BIOS memory of claim 22 wherein said background scrubber is adapted to test successively higher addresses in response to being initialized and said second set of instructions determines when said background scrubber has tested said predetermined portion of said memory by periodically testing whether a next current scrub address is lower than a previous current scrub address.

24. The BIOS memory of claim 19 wherein said first set of instructions initializes said background scrubber by setting a starting address to a highest address.

25. The BIOS memory of claim 24 wherein said background scrubber is adapted to test successively lower addresses in response to being initialized and said second set of instructions determines when said background scrubber has tested said predetermined portion of said memory by periodically testing whether a next current scrub address is higher than a previous current scrub address.

26. The BIOS memory of claim 19 wherein said first set of instructions initializes said background scrubber by setting an interval value to a lowest interval.

27. In a computer system having a memory, a method comprising the steps of:
testing a plurality of locations of the memory using a background scrubber, responsive to a processing node executing a basic input/output system (BIOS) program that initializes the background scrubber;
determining whether an error occurred during said step of testing;
if said error occurred determining whether said error is correctable or non-correctable;
if said error occurred and is non-correctable, reconfiguring the memory to exclude a memory location; and
taking a predetermined action if said error occurred and is correctable.

28. The method of claim 27 wherein said step of taking said predetermined action comprises the step of doing nothing.

29. The method of claim 27 wherein said step of taking said predetermined action comprises the step of reporting said error.

30. The method of claim 27 wherein said step of taking said predetermined action comprises the step of reconfiguring the memory to exclude said memory location.

31. The method of claim 27 wherein said step of taking said predetermined action comprises the step of retesting the memory.

* * * * *